(12) United States Patent
Murray

(10) Patent No.: US 10,491,421 B2
(45) Date of Patent: Nov. 26, 2019

(54) RING PROTECTION NETWORK MODULE

(71) Applicant: Hewlett Packard Enterprise Development LP, Houston, TX (US)

(72) Inventor: Christopher Murray, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 122 days.

(21) Appl. No.: 15/578,216

(22) PCT Filed: Jun. 1, 2015

(86) PCT No.: PCT/US2015/033530
§ 371 (c)(1),
(2) Date: Nov. 29, 2017

(87) PCT Pub. No.: WO2016/195652
PCT Pub. Date: Dec. 8, 2016

(65) Prior Publication Data
US 2018/0152318 A1    May 31, 2018

(51) Int. Cl.
| | | |
|---|---|---|
| H04L 12/28 | (2006.01) | |
| H04L 12/46 | (2006.01) | |
| H04L 12/42 | (2006.01) | |
| H04L 12/24 | (2006.01) | |
| H04L 12/705 | (2013.01) | |
| H04L 12/707 | (2013.01) | |

(52) U.S. Cl.
CPC .......... H04L 12/4637 (2013.01); H04L 12/42 (2013.01); H04L 41/0816 (2013.01); H04L 45/18 (2013.01); H04L 45/22 (2013.01)

(58) Field of Classification Search
CPC ..... H04L 12/4637; H04L 45/22; H04L 45/18; H04L 41/0816; H04L 12/42
See application file for complete search history.

(56) References Cited

U.S. PATENT DOCUMENTS

| 8,345,540 B2 | 1/2013 | Rollins |
|---|---|---|
| 8,345,576 B2 | 1/2013 | Dake |
| 8,355,319 B2 | 1/2013 | Gupta et al. |
| 8,355,348 B1 | 1/2013 | Miller et al. |
| 2006/0013584 A1 | 1/2006 | Miyazaki |
| 2009/0219806 A1 | 9/2009 | Chen et al. |

(Continued)

OTHER PUBLICATIONS

International Searching Authority, The International Search Report and the Written Opinion, dated Mar. 2, 2016, PCT/US2015/033530, 13 Pgs.

(Continued)

*Primary Examiner* — Lan-Huong Truong
(74) *Attorney, Agent, or Firm* — Hewlett Packard Enterprise Patent Department

(57) ABSTRACT

Examples herein involve establishing communication links between a first ring protection network in communication with a service network and a second ring protection network in communication with a service network, the communication links between the first ring protection network and the second ring protection network to form a management network ring; determining an owner of the management network ring; and establishing a single uplink between one network module of the management network ring and the service network.

14 Claims, 10 Drawing Sheets

(56) References Cited

U.S. PATENT DOCUMENTS

| | | | |
|---|---|---|---|
| 2010/0135154 A1 | 6/2010 | Cheung et al. | |
| 2012/0079580 A1* | 3/2012 | Johnsen | H04L 12/462 726/7 |
| 2012/0113870 A1* | 5/2012 | Chuang | H04L 12/462 370/255 |
| 2012/0243405 A1 | 9/2012 | Holness et al. | |
| 2015/0055451 A1* | 2/2015 | Holmberg | H04L 49/557 370/218 |
| 2015/0085637 A1* | 3/2015 | Nahlous | H04L 12/437 370/217 |
| 2016/0204976 A1* | 7/2016 | Singh | H04L 12/40 370/216 |
| 2016/0352570 A1* | 12/2016 | Holness | H04L 41/0816 |

OTHER PUBLICATIONS

Ryoo, J-D. et al., Ethernet Ring Protection for Carrier Ethernet Networks, (Research Paper), Apr. 2, 2008, 14 Pgs., http://www.actusnetworks.com/new/html/2.pdf.

\* cited by examiner

RING PROTECTION NETWORK MODULE

BACKGROUND

In a datacenter, network modules (e.g., Ethernet switches, Virtual Connect fabrics, etc.) may be linked to enhance connectivity and redundancy. Network modules may be linked in a variety of topologies. A ring topology provides a redundant path between each network module connected in a ring. Accordingly, a network module may be connected between two other network modules using two separate communication links. In some examples, the two communication links may send data, messages, packets, etc. in opposite directions (e.g., clockwise and counterclockwise) around the ring.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve a ring protection network module to facilitate seamlessly joining a ring protection network. In examples herein, ring protection network modules may automatically join a ring protection network upon establishing a communication link with the ring protection network. The ring protection network modules may automatically select an owner and establish a single uplink between the newly formed ring protection network to prevent a loop in customer traffic within the ring protection network or between the ring protection network and a service network.

Datacenters may include a plurality of servers or a plurality of enclosures including the servers. Communication between the servers may be facilitated using network modules. The example network modules may be configured in a management network ring. The example network modules may additionally be connected to a service network of a plurality of customer devices. In examples herein, ring protection network modules and protocols facilitate automatic configuration of a management network ring. The example ring protection network modules may detect when two ring protection networks are connected to one another, determine a single owner of the newly created ring protection network from the joined ring protection networks, and establish a single uplink from the ring protection networks to the service nework to prevent customer traffic loops in the ring protection networks or between the ring protection networks and the service network. Accordingly, a newly created ring protection network may be established without user intervention to assign an owner of the ring protection network or disable/enable uplinks of the ring protection network to prevent traffic loops.

An example method includes establishing communication links between a first ring protection network in communication with a service network and a second ring protection network in communication with a service network, the communication links between the first ring protection network and the second ring protection network to form a management network ring; determining an owner of the management network ring; and establishing a single uplink between one network module of the management network ring and the service network.

As used herein, a loop or a traffic loop refers to a series of communication links between nodes (e.g., network modules, nodes of a service network, a network, etc.) of a network (or a plurality of networks) that may cause communications to be repeatedly cycled through the communication links and the nodes (consuming bandwidth of the network(s)).

Figure 1A:
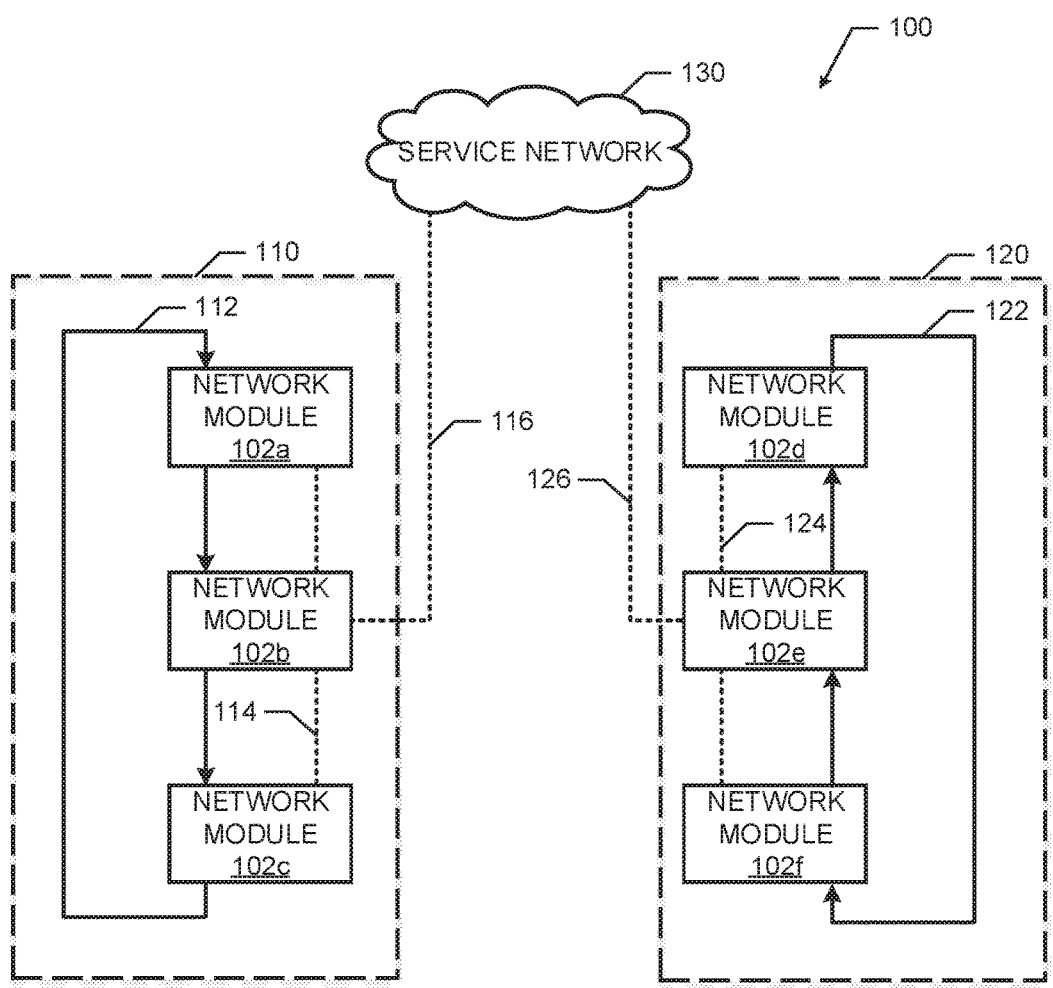
FIG. 1A illustrates a schematic diagram of an example system of example ring protection networks including example ring protection network modules that may be implemented in accordance with an aspect of this disclosure.

FIG. 1A illustrates an example system 100 including two ring protection networks 110, 120 including ring protection modules 102a-102f implemented in accordance with an aspect of this disclosure. For purposes of readability, the example ring protection network modules 102a-102f of FIG. 1A may be referred to herein collectively as the ring protection network modules 102. The example system 100 may control a datacenter (e.g., a system of servers, etc.) that communicates or provides services to a service network 130. The example service network 130 may include a plurality of client or customer devices (e.g., computers, mobile devices, or any other type of computing device) that may access information in the datacenter of the system 100. In examples disclosed herein the ring protection network modules 102 may facilitate communication between servers in communication with each of the ring protection network modules 102. For example, each of the ring protection network modules 102 of FIG. 1A may manage communication with one or more servers. In some examples, the ring protection network modules 102 may be configured in pairs to manage communications for a server enclosure having a plurality of servers. In such an example, the pairs of ring protection network modules 102 may provide redundancy or backup services in the event one of the network modules 102 of a pair fails. The example ring protection networks 110, 120 of FIG. 1A may be G.8032 networks.

In the illustrated example of FIG. 1A, the first ring protection network 110 includes ring protection modules 102a, 102b, 102c and the second ring protection network 120 includes ring protection modules 102d, 102e, 102f. In examples disclosed herein, the first ring protection network 110 and the second ring protection network 120 may be joined to form a new ring protection network (e.g., see FIGS. 4A-4D) using communication protocols of the ring protection network modules 102 in accordance with aspects of this disclosure. An example implementation of a ring protection network module that may be used to implement the ring protection network modules 102 in accordance with aspects of this disclosure is further discussed below in connection with FIG. 2.

In the illustrated example of FIG. 1A, the ring protection network modules 102a-102c of the first ring protection network 110 communicate via a management network ring 112 (represented by a solid line), such as a virtual local area network (VLAN) (e.g., VLAN 4095). In FIG. 1A, customer traffic sent/received to/from the service network 130 flows on customer traffic links 114 (represented by the dotted line) between the ring protection network modules 102a-102c. As illustrated in FIG. 1A, the ring protection network modules 102a-102c may prevent a traffic loop in the customer traffic links 114 to prevent bandwidth errors or clogging (e.g., due to repeated transmission of data around the loop) of customer traffic by enabling a single uplink 116 from one ring protection network module (the ring protection network module 102b in FIG. 1A) of the first ring protection network 110 to the service network 130. Additionally, in FIG. 1A, the example ring protection network modules 102d-102f of the second ring protection network 120 communicate via another management network ring 122. Customer traffic links 124 for the second ring protection network 120 of FIG. 1A enable communication between the ring protection network modules 102d-102f and the service network 130. Similar to the first ring protection network 110, the ring protection network modules 102d-102f prevent a loop in the customer traffic links 124 in accordance with examples herein by using a single uplink 126 to the service network 130.

Figure 1B:
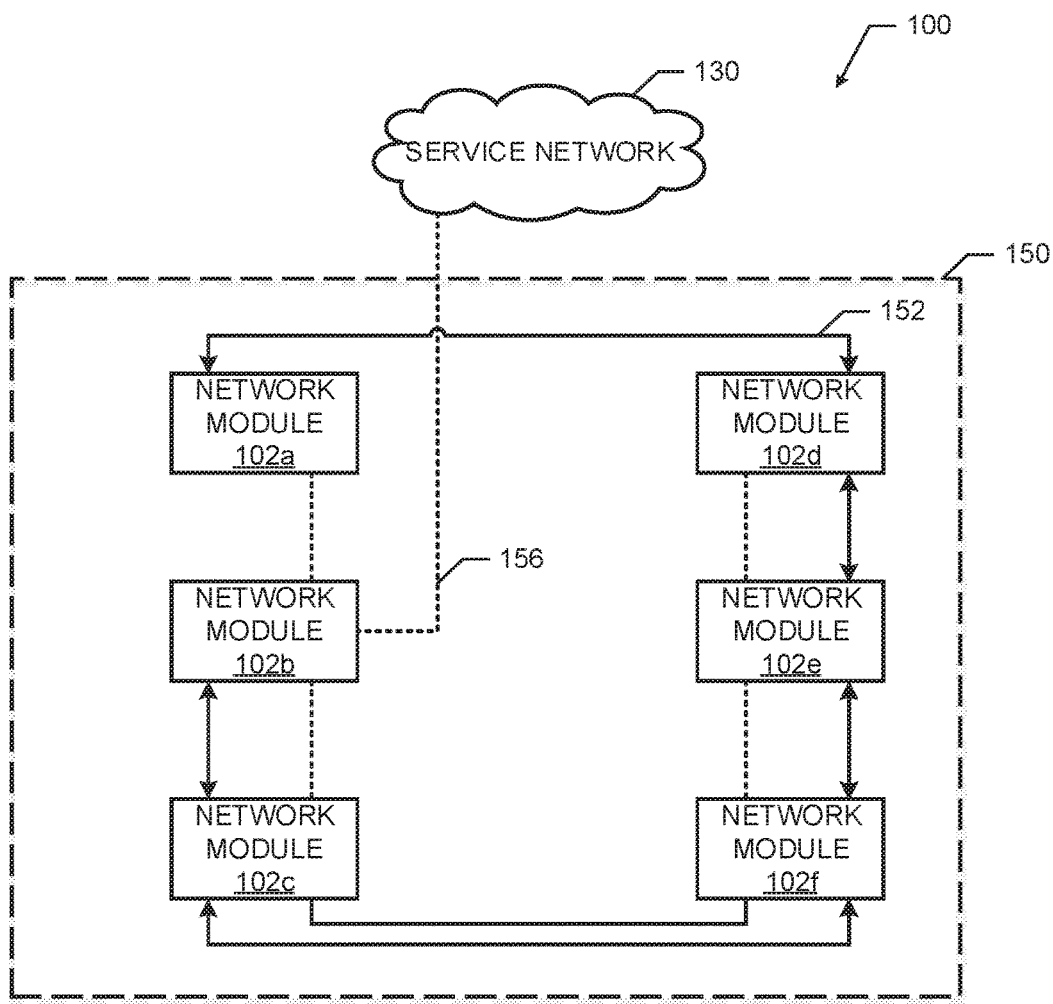
FIG. 1B illustrates a schematic diagram of the example system of FIG. 1A after joining the ring protection networks using the ring protection network modules in accordance with an aspect of this disclosure.

FIG. 1B illustrates a new ring protection network 150 created by joining the first ring protection network 110 and the second ring protection network 120 of FIG. 1A using the ring protection network modules 102a-102f in accordance with examples herein. The example first ring protection network 110 is joined to the second ring protection network 120 in FIG. 1B via wired connections (e.g., an Ethernet connection), switches, etc. between a first pair of ring protection network modules 102a, 102d and between a second pair of ring protection network modules 102c, 102f. In some examples, other connections between the network modules 102a-102f may be made to connect the first and second ring protection networks 110, 120. In FIG. 1B, the new ring protection network 150 may communicate via management network ring 152 (represented by a solid line). In the example of FIG. 1B, only a single uplink (from the ring protection network module 102b) is enabled to prevent a loop when combining the first and second ring protection networks 110, 120. For example, when the second ring protection network 120 was joined with the first ring protection network 110, the uplink 126 from the second ring protection network 120 to the service network 130 may be disabled to prevent a loop (which may be caused by the presence of both the uplink 116 of the first ring protection network 110 and the uplink 126 of the second ring protection network 120 being active). In examples disclosed herein, the ring protection network modules 102a-102f may communicate with one another to create the new ring protection network 150 from the first and second ring protection networks 110, 120 in accordance with examples herein.

Figure 2:
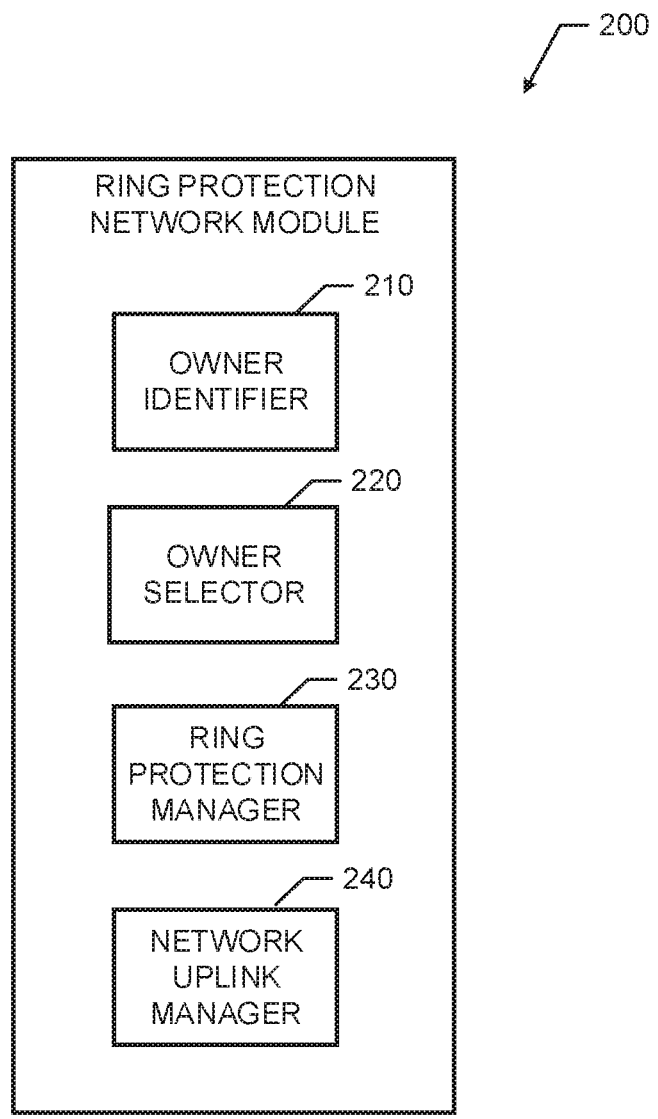
FIG. 2 is a block diagram of an example ring protection network module that may be implemented in the example ring protection networks of FIG. 1A and/or 1B in accordance with an aspect of this disclosure.

FIG. 2 is a block diagram of an example ring protection network module 200 that may be implemented in the example ring protection networks 110, 120, 150 of FIGS. 1A and/or 1B in accordance with an aspect of this disclosure. For example, the ring protection network module 200 of FIG. 2 may be used to implement the network modules 102 of FIG. 1. In the illustrated example of FIG. 2, the ring protection network module 200 includes an owner identifier 210, an owner selector 220, a ring protection manager 230, and a network uplink manager 240. In examples disclosed herein, the owner identifier 210 analyzes owners of the ring protection networks 110, 120 of FIG. 1, the owner selector 220 selects an owner from the owners of the ring protection networks 110, 120 when the ring protection networks 110, 120 are joined, the ring protection manager 230 prevents traffic loops between the ring protection networks 110, 120 and the service network 130, and the network uplink manager 240 establishes a single uplink between the joined ring protection networks 110, 120 and the service network 130.

The example owner identifier 210 sends and receives owner identifications (e.g., MAC addresses, serial numbers, Internet protocol (IP) addresses, etc.) to/from network modules of the ring protection networks 110, 120. For example, the owner identifier 210 may utilize a continuity check protocol (CCP) to communicate with network modules adjacent the network module 200 of FIG. 2. Referring to the example of FIG. 1A, an owner identifier 210 of the ring protection network module 102b may periodically (or aperiodically) send continuity check messages to the ring protection network modules 102a, 102c. Additionally, the ring protection network module 102b may periodically (or aperiodically) receive continuity check messages from the ring protection network modules 102a, 102c. The example continuity check messages may include an owner identification that indicates the owner of the ring protection network (e.g., the ring protection networks 110, 120 of FIG. 1) of the ring protection network module 200. In examples disclosed herein, the owner identifier 210 may identify an owner identification in the continuity check messages. For example, the ring protection network modules 102 of FIGS. 1A and/or 1B may send 802.1d reserve media access control (MAC) address messages point-to-point (p2p) to adjacent ring protection network modules 102. In some examples, when one of the ring protection network modules 102 is an owner, the owner ring protection network module 102 may broadcast an owner identification to all ring protection network modules connected to a network. For example, if the ring protection network module 102a of FIG. 1A is the owner of the first ring protection network 110, the ring protection network module 102a may broadcast its owner identification to the remaining ring protection network modules 102b, 102c of the first ring protection network 110. As another example, if the network module 102b is the owner of the ring protection network 150 of FIG. 1B, the ring protection network module 102b may broadcasts its owner identification to the remaining ring protection network modules 102a, 102c, 102d, 102e, 102f via the management network ring 152.

In examples herein, if the owner identifier 210 does not receive an appropriate number of messages (e.g., data packets, 802.1d reserve MAC address messages, etc.) within a threshold period of time (e.g., 1 second, 10 milliseconds, etc.) from an adjacent network module, then the owner identifier 210 may determine that the adjacent network module has been disconnected or removed from the ring protection network. In such an example, the ring protection network may enter an inactive state (e.g., a signal fail condition may be set). For example, if the ring protection network module 102a does not receive a specified number of packets within a threshold time period from the ring protection network module 102c, the owner identifier 210 of the ring protection network module 102a may determine that the connection between the ring protection network module 102a and the ring protection network module 102c has been disabled. In such an example, the owner of the first ring protection network 110 may enable a link (e.g., a link that was previously inactivated to prevent a loop) in the ring protection network 110.

The example owner selector 220 of FIG. 2 selects an owner for the ring protection network module 200 when the ring protection network module is connected to a ring protection network (e.g., the ring protection networks 110, 120, 150). In examples herein, when the ring protection network 110 is joined with the ring protection network 120 of FIG. 1A, the owner selector 220 of the network modules 102 of FIG. 1B selects an owner (e.g., the ring protection network module 102b) for the new ring protection network 150 created from the combined ring protection networks 110, 120. In some examples, the owner selector 220 may select an owner for the new ring protection network 150 based on owner identifications of owners of the ring protection networks 110, 120. For example, the owner selector 220 may utilize an owner selection protocol (OSP) that compares a MAC address of an owner identification in a message (e.g., a CCP message from an adjacent ring protection network module, or a multicast OSP message from an owner in communication with the ring protection network module 200) to a MAC address of the ring protection network module 200 of FIG. 2. If the MAC addresses are different from one another (indicating that a new ring protection network (e.g., the second ring protection network 120) was joined with the ring protection network (e.g., the first ring protection network 110) of the ring protection network module 200), then the owner selector 220 selects an owner for the newly combined ring protection network (e.g., the ring protection network 150) from the owners identified by the MAC addresses. For example, the owner selector 220 may select the owner having a lower (or lowest) valued MAC address. Accordingly, if a MAC address of an owner of the first ring protection network 110 is lower than a MAC address of an owner of the second ring protection network 120, the owner selector 220 of an ring protection network module (e.g., the ring protection network modules 102d-102f) in the second ring protection network 120 may replace the owner of the ring protection network module with the owner of the first ring protection network 110 by assigning the ring protection network module to the owner (e.g., the ring protection network module 102b) of the first ring protection network 110. In such an example, the ring protection network module from the second ring protection network 120 may effectively join the first ring protection network 110. Such a change in an ring protection network module in the second ring protection network 120 may cascade through remaining modules (see FIGS. 4A-4D) due to sending the new owner identification (MAC address) until all ring protection network modules of the second ring protection network 120 are joined to the first ring protection network 110 creating a new ring protection network e.g., the ring protection network 150 of FIG. 1B).

The example ring protection manager 230 of FIG. 2 prevents a loop in a ring protection network (e.g., the ring protection networks 110, 120, 150 of FIG. 1A or 1B) of the ring protection network module 200 of FIG. 2 by disabling a link between the ring protection network module 200 and the service network 130. For example, when the second ring protection network 120 is joined with the first ring protection network 110 in FIG. 1B, an owner (e.g., the ring protection network module 102b) may disable the uplink 126 from the ring protection network module 102e or instruct the ring protection network module 102e to display the uplink 126 (e.g., after the ring protection network module 102e reassigns its owner to the owner of the first ring protection network 110) in the second ring protection network 120 prior to creating the new combined ring protection network 150. In examples herein, the ring protection manager 230 may communicate via G.8032 protocol to identify and disable uplinks or connections between ring protection network modules that may cause a loop between ring protection network modules of a ring protection network or between a ring protection network and a service network (e.g., the service network 130). For example, the ring protection manager 230 may disable a link in the management network ring to prevent a loop and the ring protection manager 230 may disable an uplink to the service network 130, Accordingly, in example herein, the ring protection manager 230 may prevent two sources of loops from creating a traffic loop.

In examples herein, the ring protection manager 230 of FIG. 2 may deactivate/disable an uplink from the ring protection network module 200 to the service network 130 if the owner identifier 210 determines that a different owner identification than that of an assigned owner of the ring protection network module 200 has been received (e.g., via CCP message). Additionally or alternatively, the ring protection manager 230 may deactivate/disable a link in the management network ring of a ring protection network when the owner identifier 210 receives a different owner identification that that of the assigned owner of the ring protection network module. The network uplink manager 240 disable/deactivate the uplink in this case because the different owner identifications may indicate that the network module 200 is joining another ring protection network or another ring protection network module is joining the ring protection network of the ring protection network module 200.

The example network uplink manager 240 of FIG. 2 manages uplinks from the ring protection network module 200 to a service network (e.g., the service network 130). More specifically, the network uplink manager 240 may activate/enable or deactivate/disable an uplink from the ring protection network module 200 to the service network 130 based on a state of the ring protection network of the ring protection network module 200. The network uplink manager 240 may activate an uplink in response to instructions from an owner or if the network module 200 is the owner. In some examples herein, once the ring protection networks 110, 120 of FIG. 1A are combined to form the new ring protection network 150, the network uplink manager 240 may identify all potential uplinks from the new ring protection network 150 to the service network 130. For example, if the network module 200 is the owner of the ring protection network 150, the network uplink manager 240 may identify which of the network modules 102 (e.g., the network modules 102b, 102e) of FIG. 1A have a communication link (e.g., the uplinks 116, 126) with the service network 130. Of the network modules 102 having a link to the service network, the network uplink manager 240 may select a single active uplink (e.g., either the uplink 116 or the uplink 126) to the service network 130. In examples herein, the network uplink manager 240 may identify that a ring protection network (e.g., the ring protection network 150) is complete after the owner identifier 210 does not detect different owner identifications (e.g., in CCP messages) after a threshold period of time.

While an example manner of implementing the ring protection network modules 102 of FIGS. 1A and 1B is illustrated in FIG. 2, at least one of the elements, processes and/or devices of the ring protection network module 200 illustrated in FIG. 2 may be combined, divided, re-arranged, omitted, eliminated and/or implemented in any other way. Further the owner identifier 210, the owner selector 220, the ring protection manager 230, the network uplink manager 240, and/or, more generally, the example ring protection network module 200 of FIG. 2 may be implemented by hardware and/or any combination of hardware and executable instructions (e.g., software and/or firmware). Thus, for example, any of the owner identifier 210, the owner selector 220, the ring protection manager 230, the network uplink manager 240, and/or, more generally, the example ring protection network module 200 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the owner identifier 210, the owner selector 220, the ring protection manager 230, and the network uplink manager 240 is/are hereby expressly defined to include a tangible computer readable storage device or storage disk such as a memory, a digital versatile disk (DVD), a compact disk (CD), a Blu-ray disk, etc. storing the executable instructions. Further still, the example ring protection network module 200 of FIG. 2 may include at least one element, process, and/or device in addition to, or instead of, those illustrated in FIG. 2, and/or may include more than one of any or all of the illustrated elements, processes and devices.

Figure 3:
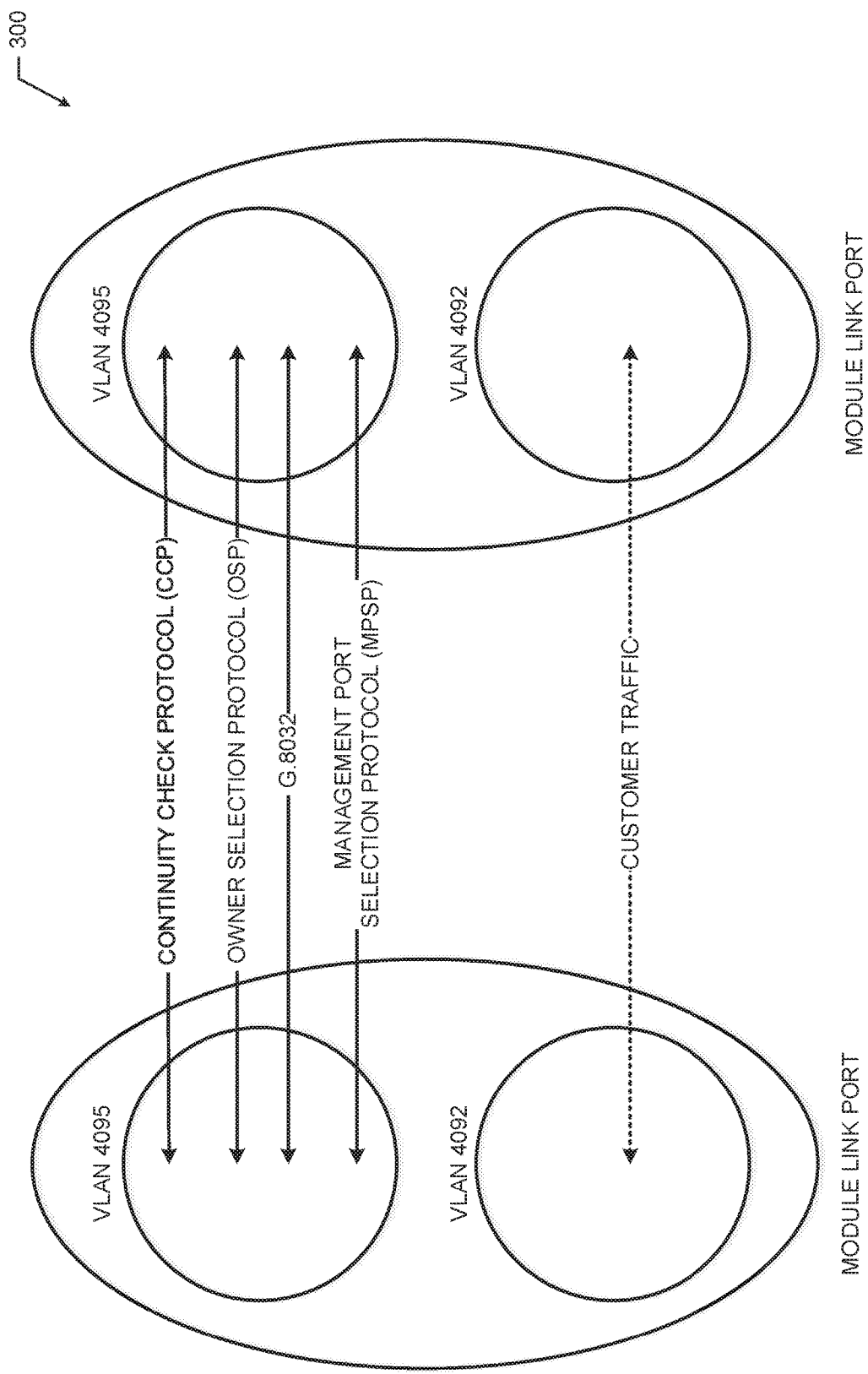
FIG. 3 is a protocol diagram of example communications between ring protection network modules that may each be implemented by the ring protection network module of FIG. 2 in accordance with an aspect of this disclosure.

FIG. 3 is a protocol diagram of example communications between module link ports 300a, 300b that may each be implemented by the ring protection network module 200 of FIG. 2 in accordance with an aspect of this disclosure. For example, the module link ports 300a, 300b may represent connections to the ring protection network modules 102a, 102b of FIG. 1A or 1B or the ring protection network module 200 of FIG. 2. In the illustrated example of FIG. 3, the link ports 300a, 300b include a VLAN 4095 communication link and a VLAN 4092 communication link. In examples herein, the VLAN 4095 communication link may be used as a communication link for a management network ring of a ring protection network and the VLAN 4092 may be used for customer traffic.

As illustrated in FIG. 3, the VLAN 4095 communication link may be used to send CCP communications, OSP communications, G.8032 communications, and MPSP communications. Accordingly, the owner identifier 210 may send/receive an owner identification corresponding to an owner of the ring protection network modules of the link ports via the CCP protocol of FIG. 3, The example owner selector 220 may send owner selection information via the OSP protocol. In examples herein, the ring protection manager 230 may disable uplinks or send instructions to disable uplinks via the G.8032 protocol. And finally, the network uplink manager 240 may activate an uplink or send instructions to activate an uplink via the MPSP protocol illustrated in FIG. 3. Accordingly, the communication protocols utilized in the VLAN 4095 communication link of FIG. 3 may be used to join or maintain ring protection networks (e.g., the ring protection networks 110, 120, 150) in accordance with aspects of this disclosure.

Figure 4A:
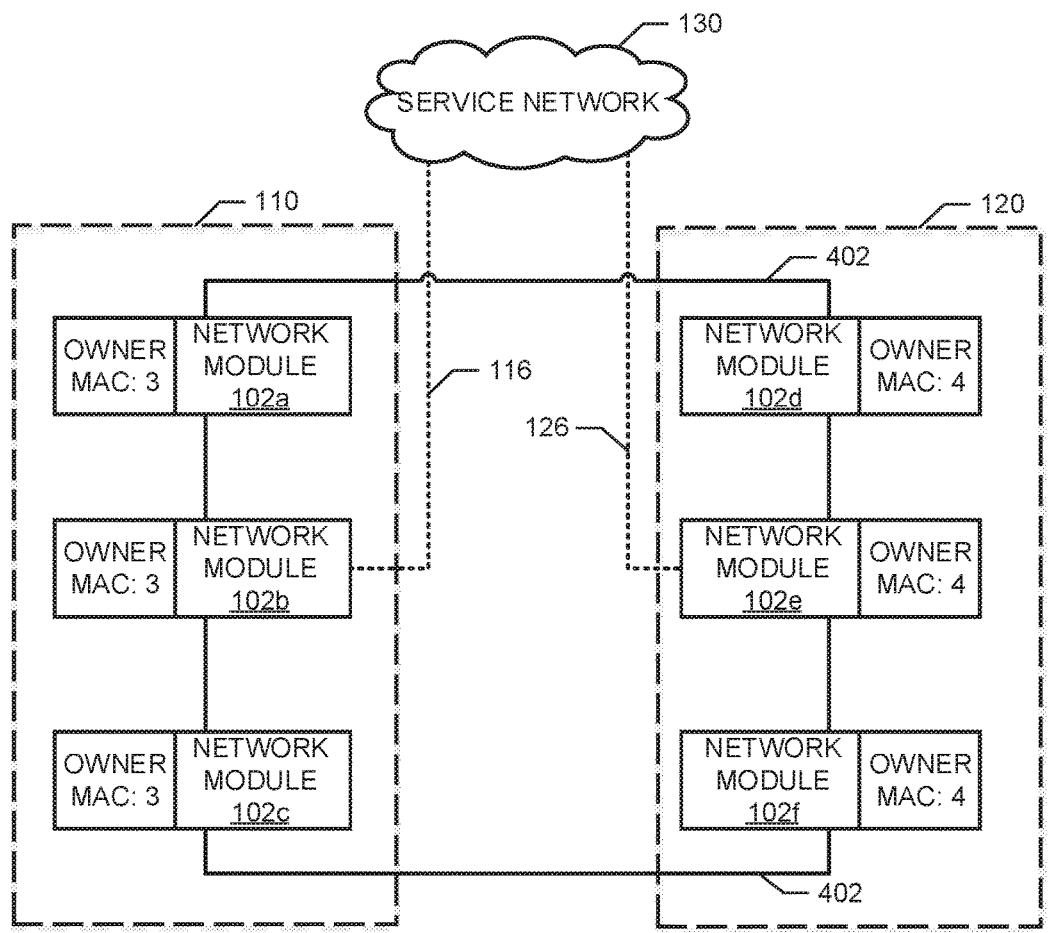
FIGS. 4A-4O schematically illustrate joining the ring protection networks of the system of FIG. 1A to form the ring protection network of FIG. 1B in accordance with an aspect of this disclosure.
Figure 4B:
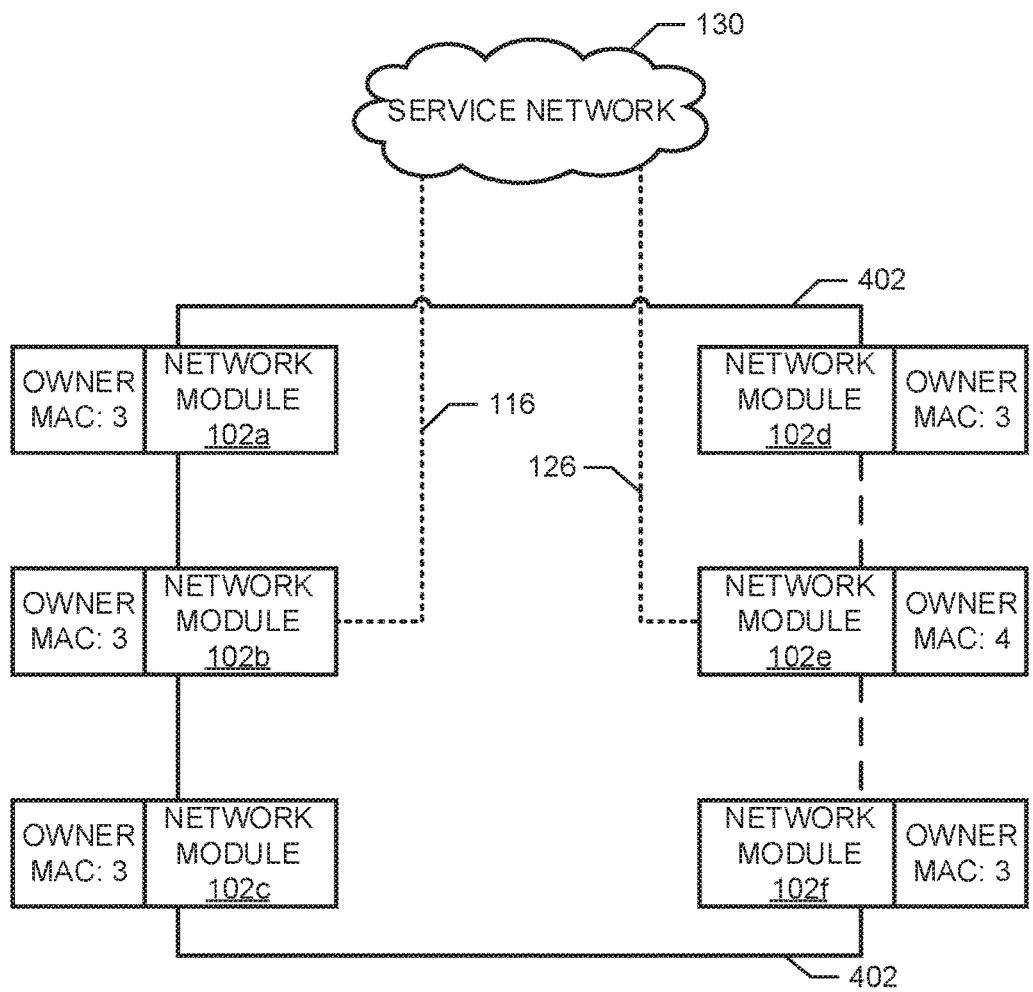
Figure 4C:
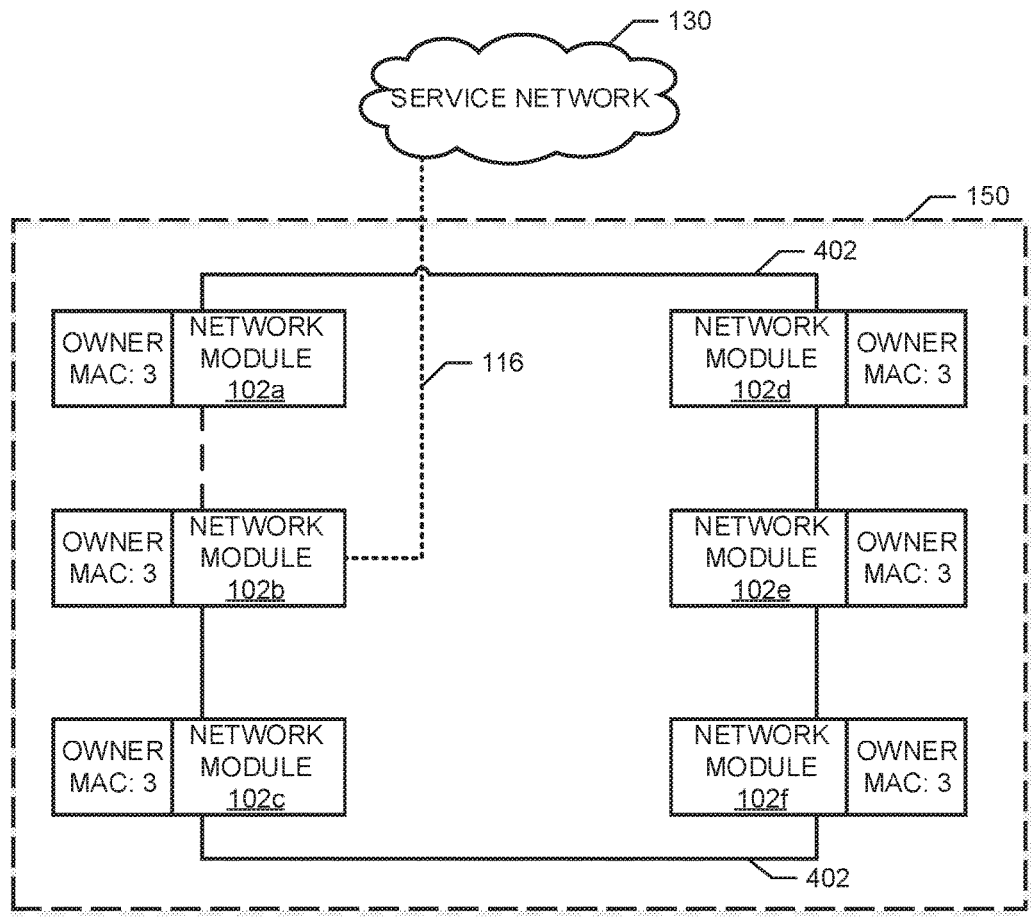

FIGS. 4A-4C schematically illustrate joining the ring protection networks 110, 120 of the system 100 of FIG. 1A to form the ring protection network 150 of FIG. 1B in accordance with an aspect of this disclosure. In FIGS. 4A-4C, the owner MAC address of the ring protection network modules 102 is indicated with the corresponding module at that particular moment. Additionally, the connections between the modules 102 of FIGS. 4A-4C may include the communication links (e.g., the VLAN 4095 and the VLAN 4092) of FIG. 3. In the following example represented in FIGS. 4A-4C, the ring protection network module 102b is the owner of the ring protection network 110 and the ring protection network module 102e is the owner of the prn 120. As will be discussed below, the FIGS. 4A-4C sequentially show the ring protection network modules 102d-102f of the second ring protection network 120 joining the first ring protection network 110 in a cascading manner.

In FIG. 4A, communication links 402 are established between the first ring protection network 110 and the second ring protection network 120. For example, in FIG. 4A, the communication links may be established by connecting a wire, activating a switch, etc. In some examples, the communication links 402 may be virtual communication links. In the illustrated example of FIG. 4A, the MAC address of the owner 102b of the first ring protection network 110 is "3" and the MAC address of the owner 102e of the second ring protection network 120 is "4." Accordingly, both the first and second ring protection networks 110, 120 have different owners 102b, 102e respectively in FIG. 4A.

In FIG. 4B, after the communication links 402 have been established, the ring protection network modules 102d, 102f join the first ring protection network 110 by assigning the owner MAC address "3" to the respective modules. Accordingly, in FIG. 4B, the owner of the ring protection network modules 102d, 102f is the ring protection network module 102b. To join the first ring protection network 110, the owner identifiers 210 of the ring protection network modules 102d, 102f identify that the MAC address (i.e., the owner identification) of the ring protection network modules 102a, 102c, respectively, are different than the owner MAC address of the owner of the ring protection network modules 102d, 102f. Furthermore, the ring protection manager 230 disables customer traffic links between (denoted by the dotted line) the ring protection network module 102e and the adjacent ring protection network modules 102d, 102f.

Accordingly, in FIG. 4B, the owner selector 220 of the ring protection network modules 102d, 102f select an owner from the owners of the ring protection networks 110, 120 based on the difference in the MAC addresses. In the illustrated examples of FIGS. 4A-4C, the owner selector 220 selects the owner that has a lower MAC address. In some examples, different techniques (e.g., based on higher MAC address, higher/lower serial number, higher/lower IP address, etc.) may be used to select the owner. In examples herein, when all ring protection network modules of a ring protection network or ring protection network modules in communication with the ring protection network utilize a same selection technique and communication links are established with a new ring protection network, the ring protection networks may effectively be joined as illustrated in the example of FIGS. 4A-4C.

In FIG. 4C, the last network module 102e has joined the first ring protection network 110 by adopting a new owner in a similar manner as the network modules 102d, 102f of FIG. 4B. Additionally, in FIG. 4C, when the owner identifier 210 of the ring protection network module 102*e* detects the ring protection network modules 102*d*, 102*f* have different owners (based on CCP messages indicating different owner identification) than the ring protection network module 102*e*, the ring protection manager 230 of the ring protection network module 102*e* disables the uplink 126 to prevent a loop in the ring protection network 150. Additionally, in the example of FIG. 4C, the ring protection manager 230 disables a link between the owner ring protection module 102*b* and an adjacent ring protection module 102*a* to prevent a loop in the network management ring (denoted by dashed dotted line). In FIG. 4C, all of the network modules 102 have a same owner 102*b*. Therefore, the network uplink manager 240 of the ring protection network module 102*b* may ensure that a single uplink 116 is established between the new ring protection network 150 and the service network 130 to prevent a loop in customer traffic. Accordingly, in FIG. 4C the ring protection networks 110, 120 were joined in accordance with examples herein.

Figure 5:
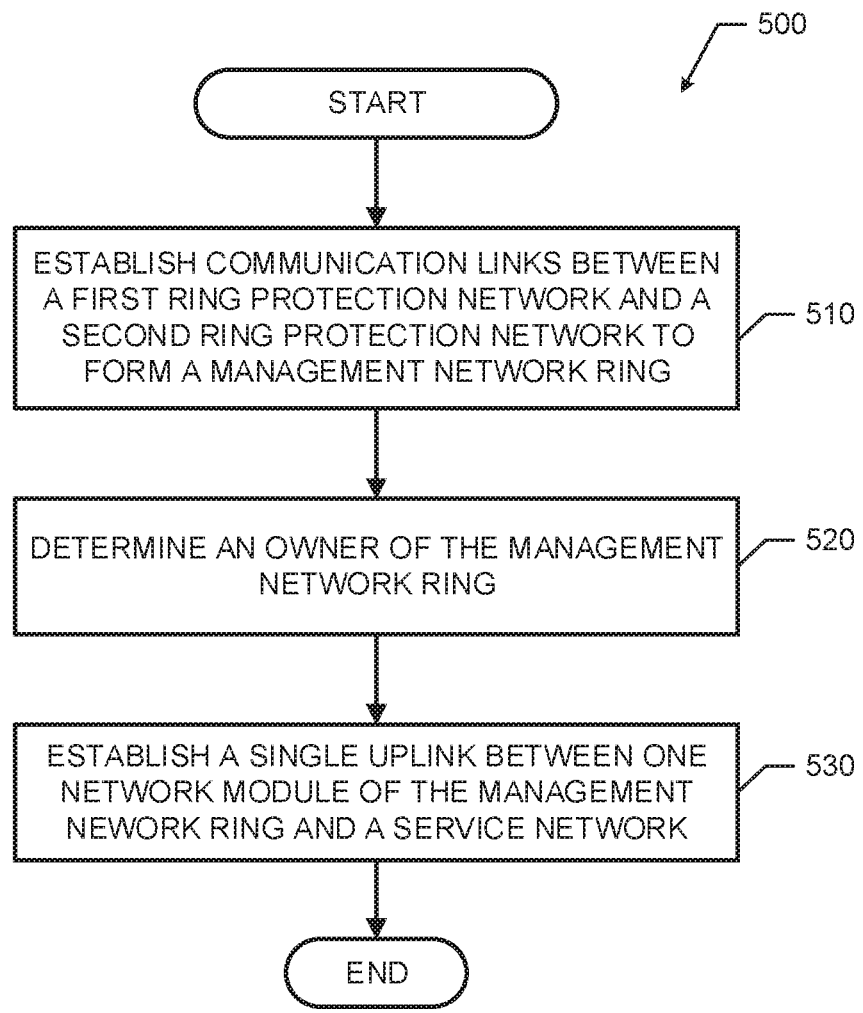
FIG. 5 is a flowchart representative of example machine readable instructions that may be executed to implement the ring protection network module of FIG. 2 in accordance with an aspect of this disclosure.
Figure 6:
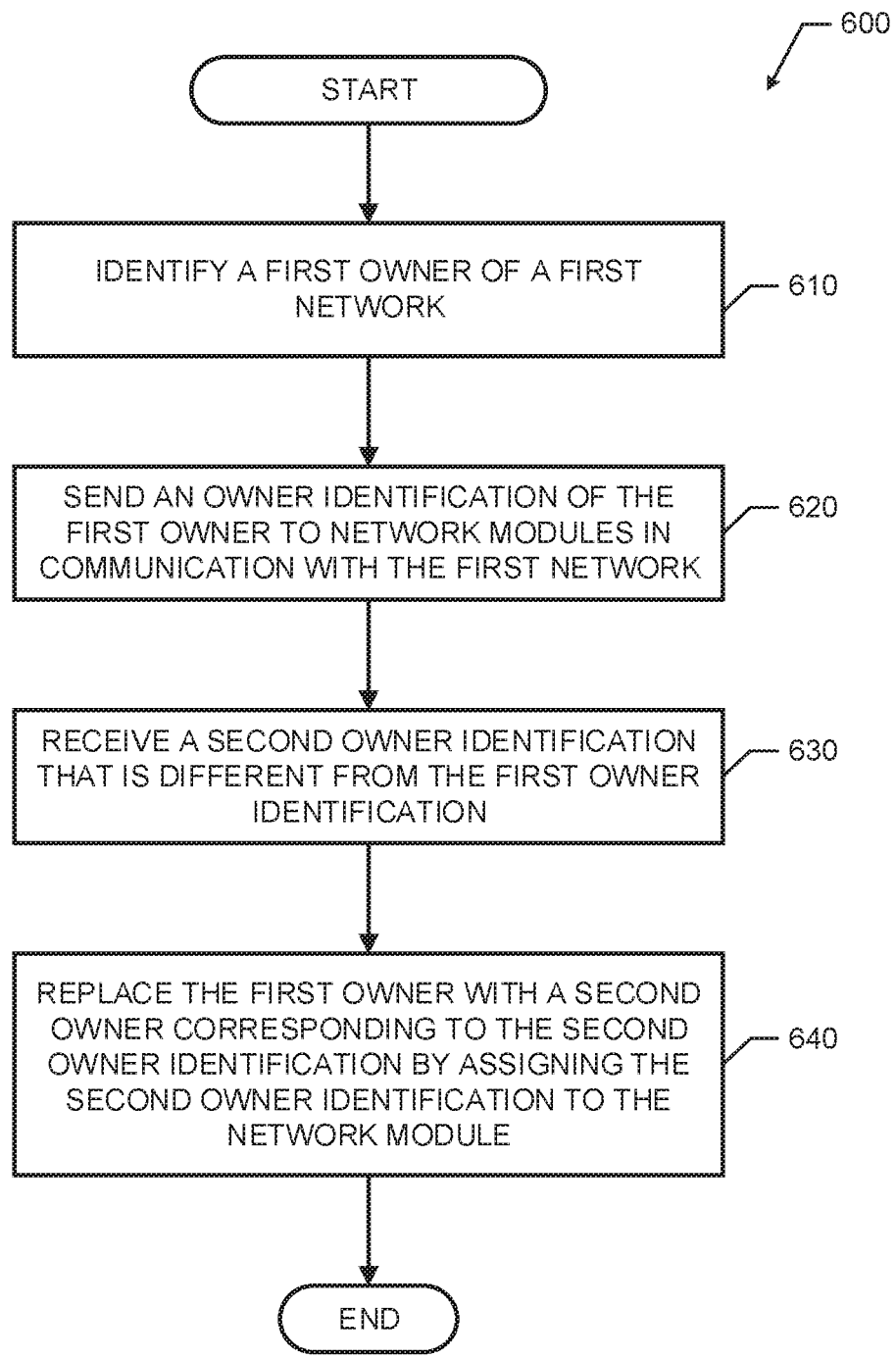
FIG. 6 is another flowchart representative of example machine readable instructions that may be executed to implement the ring protection network module of FIG. 2 in accordance with an aspect of this disclosure.

Flowcharts representative of example machine readable instructions for implementing the ring protection network module 200 of FIG. 2 are shown in FIGS. 5 and 6. In this example, the machine readable instructions comprise a program/process for execution by a processor such as the processor 712 shown in the example processor platform 700 discussed below in connection with FIG. 7. The program (s)/process(es) may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 712, but the entire program/process and/or parts thereof could alternatively be executed by a device other than the processor 712 and/or embodied in firmware or dedicated hardware. Further, although the example program(s)/process(es) is/are described with reference to the flowcharts illustrated in FIGS. 5 and 6, many other methods of implementing the example ring protection network module 200 may alternatively be used. For example, the order of execution of the blocks may be changed, and/or some of the blocks described may be changed, eliminated, or combined.

The example process 500 of FIG. 5 begins with an initiation of the ring protection network module 200 (e.g., upon startup, upon instructions from a user, upon startup of a device implementing the ring protection network module 200 (e.g., an enclosure processor), etc.). The process 500 of FIG. 5 may be executed to join the two ring protection network 110, 120 of FIG. 1A to create the ring protection network 150 of FIG. 1B. At block 510 of FIG. 5, the ring protection network module 200 establishes communication links between a first ring protection network and a second ring protection network to form a management network ring. For example, at block 510, the ring protection network module 200 may be part of the first ring protection network and may be connected to or detect a connection (e.g., via owner identifier 210 analyzing CCP messages) to a ring protection network module of the second ring protection network module. At block 510, the ring protection networks may be in communication with a service network (e.g., the service network 130).

At block 520 of the example process 500 of FIG. 5, the ring protection network module 200 determines an owner of the management network ring. For example, at block 520, the owner selector 220 may select an owner of the first ring protection network or an owner of the second ring protection network to be the owner of the management network ring. In the example process 500 of FIG. 5, at block 530, the network uplink manager 240 of the network module establishes a single uplink between one network module of the management network ring and the service network. For example, at block 530, the network uplink manager 240 may disable other uplinks between network modules of the management network ring (e.g., an uplink from one of the first ring protection network or second ring protection network). After block 530, the example process 500 ends.

The example process 600 of FIG. 6 begins with an initiation of the ring protection network module 200. In examples disclosed herein, each of the ring protection network modules 102 may be implemented by executing the process 600 of FIG. 6 simultaneously or substantially simultaneously while connected to a same ring protection network or a plurality of ring protection networks in communication with one another. At block 610, the owner identifier 210 identifies a first owner of a first ring protection network. For example, the owner identifier 210 may identify the ring protection network module 102*b* to be the owner of the first ring protection network 110 of FIG. 1A. At block 620, the owner identifier 210 may send an owner identification via a management network ring (e.g., the MAC address of the ring protection network module 102*b*) to ring protection network modules in communication with the first ring protection network (e.g., to any of the ring protection network modules 102 of FIG. 1A or 1B). The first owner identification identifies an owner of the first network of the ring protection network module 200.

At block 630 of the example process 600 of FIG. 6, the owner identifier 210 of the ring protection network module 200 of FIG. 2 receives a second owner identification that is different form the first owner identification via the management network ring. For example, the ring protection network module 102*d* may receive an owner identification indicating a first owner of the first ring protection network 110 from the ring protection network module 102*a*. At block 640, the owner selector replaces the first owner with the second owner to control communication between the first network and the service network based on the difference between the second owner identification and the first owner identification by assigning the second owner identification to the network module. After block 640, the example process ends.

As mentioned above, the example processes 500, 600 of FIGS. 5 and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 7:
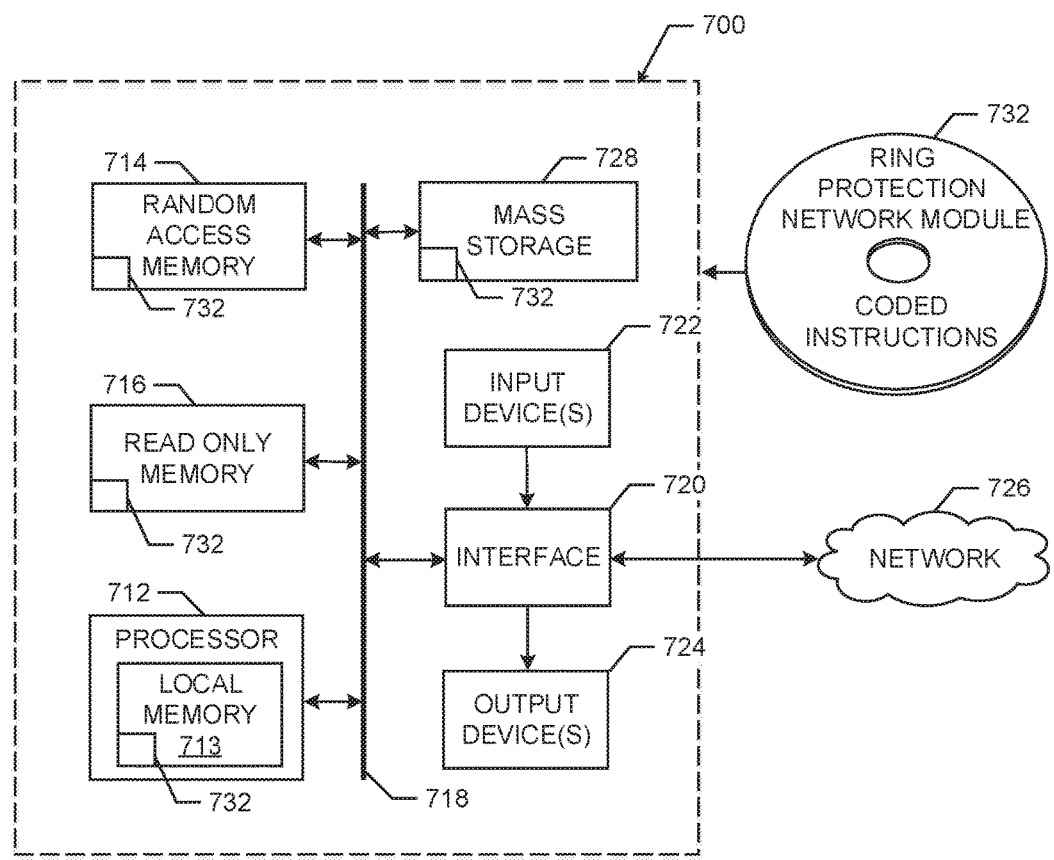
FIG. 7 is a block diagram of an example processor platform capable of executing the instructions of FIGS. 5 and/or 6 to implement the ring protection network module of FIG. 2.

FIG. 7 is a block diagram of an example processor platform 700 capable of executing the instructions of FIGS. 5 and/or 6 to implement the ring protection network module 200 of FIG. 2. The example processor platform 700 may be or may be included in any type of apparatus, such as a server, a personal computer, an Internet appliance, or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, at least one input device 722 is connected to the interface circuit 720. The input device(s) 722 permit(s) a user to enter data and commands into the processor 712. The input device(s) can be implemented by, for example, a keyboard, a button, a mouse, a touchscreen, a track-pad, etc.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing executable instructions (e.g., software) and/or data. Examples of such mass storage device(s) 728 include floppy disk drives, hard drive disks, compact disk drives, Blu-ray disk drives, RAID systems, and digital versatile disk (DVD) drives.

The coded instructions 732 of FIGS. 5 and/or 6 may be stored in the mass storage device 728, in the local memory 713 in the volatile memory 714, in the non-volatile memory 716, and/or on a removable tangible computer readable storage medium such as a CD or DVD.

From the foregoing, it will be appreciated that the above disclosed methods, apparatus and articles of manufacture provide ring protection network modules to facilitate automatic configuration of a ring protection network. The example ring protection network modules may automatically select an owner of a ring protection network and establish a single uplink between the ring protection network and a service network. For example, two ring protection networks comprised of the ring protection network modules disclosed herein may be joined, and, using the example communication protocols disclosed herein, the ring protection network modules may automatically establish a single owner of the joined ring protection networks and a single uplink with a service network from the joined ring protection networks.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    establishing communication links between a first ring protection network in communication with a service network and a second ring protection network in communication with a service network, the communication links between the first ring protection network and the second ring protection network to form a management network ring;
    determining an owner of the management network ring; and
    establishing a single uplink between one network module of the management network ring and the service network by enabling only one communication link from one network module of the management network ring to the service network and disabling any other communication links between other network modules of the management network ring and the service network before the networks have joined.

2. The method of claim 1, further comprising:
    determining the owner of the first ring protection network by selecting an owner of the first ring protection network or an owner of Phell a second ring protection network controller.

3. The method of claim 2, further comprising:
    selecting the owner of the first network or the owner of the second network as the owner of the management network ring based on media access control (MAC) addresses of the owner of the first network and the owner of the second network.

4. A non-transitory machine readable medium comprising instructions that when executed cause a machine to at least:
   identify a first owner of a first network based on a first owner identification assigned to a network module, the first owner to control communication between the first network and a service network;
   send the first owner identification via a management network ring of the first network to network modules in communication with the first network, the first owner identification identifying the first owner of the first network;
   receive a second owner identification that is different from the first owner identification via the management network ring, the second owner identification identifying a second owner of a second network in communication with the first network; and
   replace the first owner with the second owner to control the communication between the first network and the service network based on the difference between the second owner identification and the first owner identification by assigning the second owner identification to the network module.

5. The non-transitory machine readable medium of claim 4, wherein the instructions, when executed further cause the machine to:
   disable an uplink between the first network and the service network in response to detecting the second network is in communication with the first network based on receiving the second owner identification.

6. The non-transitory machine readable medium of claim 5, wherein the instructions, when executed further cause the machine to:
   disable the uplink between the first network and the service network in response to detecting that the second owner identification is different than the first owner identification.

7. The non-transitory machine readable medium of claim 4, wherein the instructions, when executed further cause the machine to:
   join the second network to the first network via the management network ring to create a new network to communicate with the service network, when all network modules of the first network and the second network are assigned the second owner identification.

8. The non-transitory machine readable medium of claim 7, wherein the instructions, when executed further cause the machine to:
   establish a single uplink between the new network and the service network to prevent a traffic loop in the new network and service network.

9. The non-transitory machine readable medium of claim 4, wherein the instructions, when executed further cause the machine to:
   send the second owner identification via the management network ring to network modules in communication with the network after the network module is assigned the second owner identification, the second owner identification identifying the second owner as the network controller of the first network and the second network.

10. The non-transitory machine readable medium of claim 4, wherein the first network comprises a first G.8032 network and the second network comprises a second G.8032 network.

11. An apparatus comprising:
   an owner identifier to determine an owner of a first ring protection network from messages received from network modules of the first ring protection network, the messages received via a management network of the ring protection network;
   an owner selector to select an owner of the first ring protection network based on owner identifications received in the messages and an owner identification assigned to the apparatus, the owner identification assigned to the apparatus indicating the owner of the first ring protection network;
   a ring protection manager to disable a link between the ring protection network and a service network to prevent a traffic loop between the ring protection network and the service network when network modules of a second ring protection network are in communication with the first ring protection network; and
   a network uplink manager to select a single network module from the network modules of the first ring protection network or the second ring protection network to establish a communication link with the service network to enable traffic between the first and second ring protection networks and the service network.

12. The apparatus of claim 11, wherein the apparatus is the owner of a first network.

13. The apparatus of claim 11, wherein the owner selector selects the owner of the first ring protection network by selecting a lowest media access control (MAC) address among the owner identifications received in the messages and the owner identification assigned to the apparatus.

14. The apparatus of claim 11, wherein the second ring protection network and the first ring protection network are combined to create a new ring protection network when all network modules of the first ring protection network and all network modules of the second ring protection network are assigned a same owner identification representative of a new owner of the new ring protection networks.

* * * * *